Nov. 21, 1950 — R. S. ARIES — 2,530,592
CONVERTIBLE BABY CARRIAGE
Filed April 2, 1948 — 2 Sheets-Sheet 1
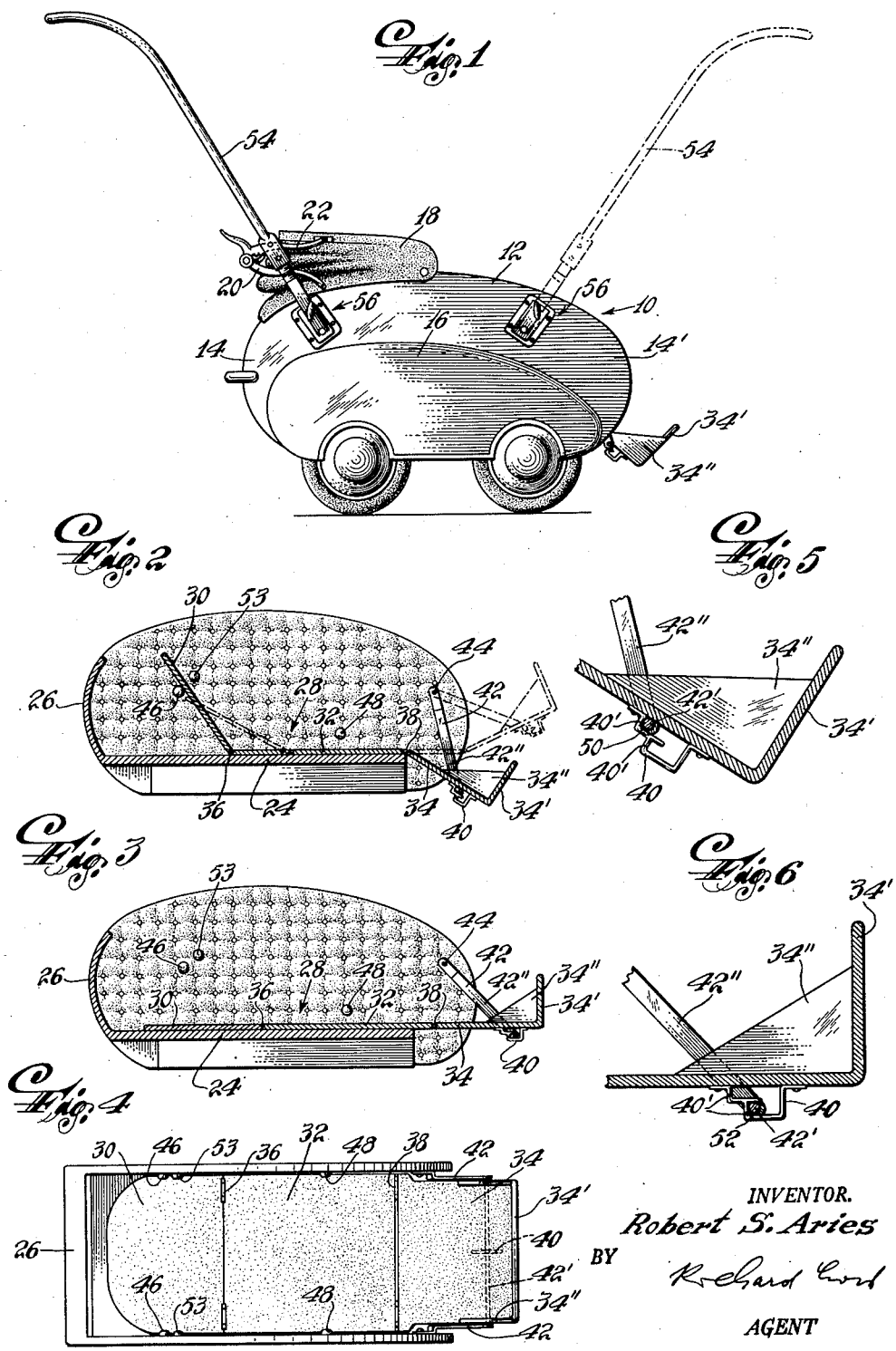
INVENTOR.
Robert S. Aries
BY
Richard Ford
AGENT Nov. 21, 1950 — R. S. ARIES — 2,530,592
CONVERTIBLE BABY CARRIAGE
Filed April 2, 1948 — 2 Sheets-Sheet 2
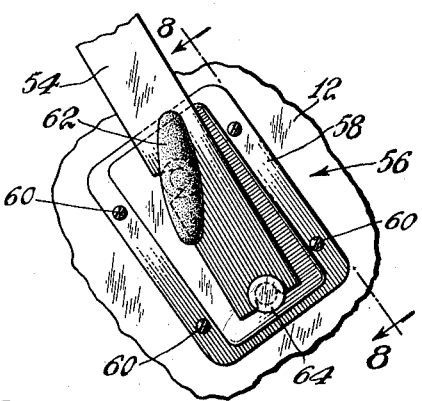
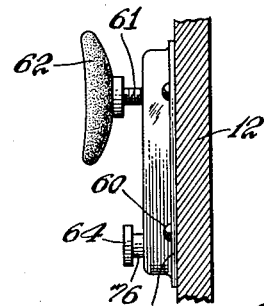
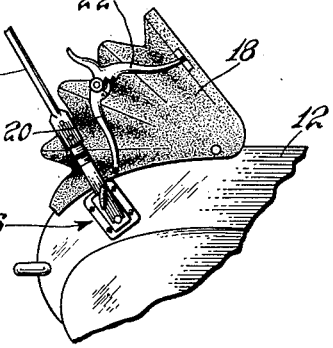
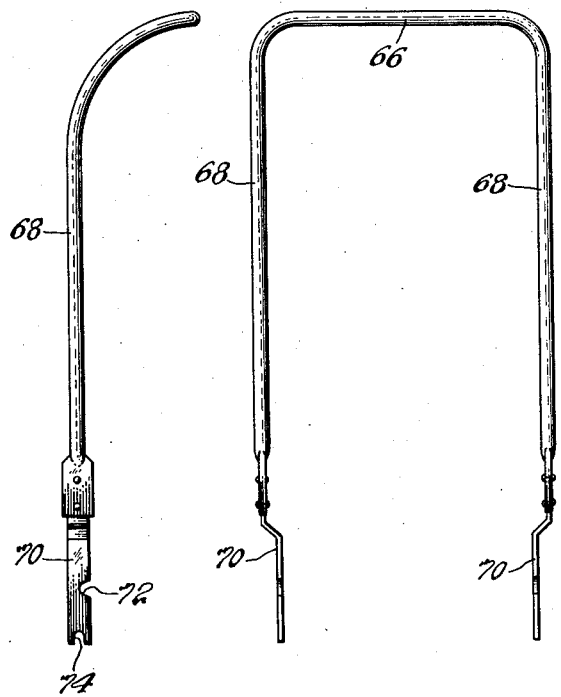
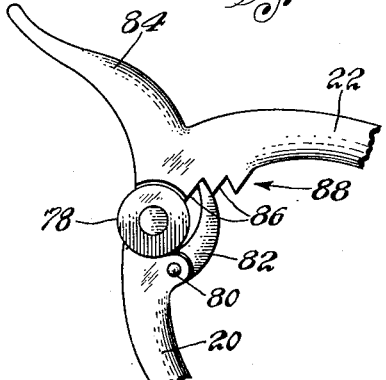
INVENTOR.
Robert S. Aries
BY
AGENT Patented Nov. 21, 1950

2,530,592

UNITED STATES PATENT OFFICE 2,530,592

CONVERTIBLE BABY CARRIAGE

Robert S. Aries, New York, N. Y.

Application April 2, 1948, Serial No. 18,599

4 Claims. (Cl. 296—63)

This invention relates to a baby carriage or similar vehicle, for instance, a toy carriage, and more particularly to carriages of the so-called stroller type.

The primary object of my invention centers about a carriage which can be used both as a sleeper type carriage and a stroller or go-cart. Such convertible carriages, which permit, for instance, outdoor sleeping when the infant or child lies at full length, and also allow the child to sit, have already been suggested. Some of the prior suggestions aim at a carriage designed to serve chiefly for sleeping purposes, whereby, however, the front of the carriage can be swung downwardly to form a foot rest for the occupant when the carriage is used as a stroller and the occupant is seated. While such prior constructions were of the coach type to be converted into a stroller, the latter to be restored to the original coach, and the mounting of the footwell was complicated to manipulate and lock, my present invention aims at a stroller which is easily convertible to a sleeper to give every comfort to the occupant when in a lying position.

It has also been suggested to make a carriage in two sections which are hinged together, the rear section being stationary and the front section being adjustable to permit the child either to recline or sit. This construction has many disadvantages, one disadvantage being the foldable connection between said front section and the running gear, another disadvantage being that the sides of the two sections are not continuous. According to another prior suggestion, the whole body of the carriage may be adjusted to either the reclined position permitting the child to lie or the position allowing the child to sit. The provision for such an adjustment of the entire carriage body asks for a complicated support of the superstructure of the carriage. It is an important object of my invention to avoid the disadvantages of these prior constructions and to generally improve the convertible type of carriages.

A more specific object of the present invention is to provide a stroller the conversion of which to a carriage of the sleeper type is effected by adjusting merely the seat.

Another object of this invention is to provide a stroller which can be pushed from either end of the carriage.

Still another object of this invention is to provide a stroller the folding top of which can be releasably locked in any position between the open and collapsed positions.

To the accomplishment of the foregoing and the other objects which will hereinafter appear, my invention consists in the elements of a baby carriage and the relation of these elements one to the other, as are more particularly described in the following specification and sought to be defined in the claims. The specification is accompanied by drawings in which:

Fig. 1 is a side elevation of a baby carriage embodying features of my present invention, the folding top being shown collapsed, the detachable handle of the carriage being shown in its front position;

Fig. 2 is a fragmentary sectional side elevation of same showing the seat for use of the carriage as a stroller, this view being also explanatory of the conversion of the seat;

Fig. 3 is a section similar to that of Fig. 2, but showing the seat for use of the carriage as a coach;

Fig. 4 is a top view of the carriage as shown in Fig. 3;

Figs. 5 and 6 are enlarged details of the seat as shown in Fig. 2 and Fig. 3, respectively;

Fig. 7 is an enlarged elevational view showing an end portion of the carriage handle and a bracket to illustrate the handle attaching mechanism;

Fig. 8 is a view in the direction of the arrows 8 in Fig. 7, the end portion of the handle being omitted;

Fig. 9 is an elevation of the handle;

Fig. 10 is a plan view of same;

Fig. 11 is a fragmentary view in elevation showing the folding top partly unfolded; and Fig. 12 is an enlarged view in elevation of the bows of the top.

Referring now in greater detail to the drawings, particularly Figs. 1 through 6, the carriage has a body 10 the sides 12 of which are of solid construction and streamline form in the embodiment shown for illustration. It will be noted that the similarity in appearance of the ends 14 and 14' of the sides 12 and the provision of fenderlike structures 16 make the carriage look modern and attractive. Fastened to the body of the carriage is a folding top 18 which is shown in Fig. 1 in collapsed condition, the props 20 and 22 being adapted to be locked in any desired position between the collapsed and outstretched conditions so that the top can be held in any position intermediate the folded and unfolded positions.

The body 10 consists, in addition to the sides 12, of a bottom 24 and a rear 26, the sides and the rear being preferably upholstered, as indicated in Figs. 2 and 3. The way of mounting the body on the running gear will necessarily vary with different springs used and/or different frames of the running gear, and it is not deemed necessary to describe the connection between the body and the running gear.

Essential to my invention is the seat of the carriage generally designated 28 which consists of three sections, the back rest 30, the actual seat 32, and the foot rest 34. The foot rest is provided with a protecting end wall 34' and small triangular side walls 34''. The seat sections are hingedly connected with each other at 36 and 38. The foot rest has on its lower side a bail-like adjustment bracket 40, the stepped part 40' of the bracket forming two differently located seats for the horizontal portion 42' of a stirrup 42. The vertical portions 42'' of the stirrup are pivotally attached to the inner faces of the sides 12 at 44. According to my invention, I also provide two buttons 46 and 48 on each side 12. These buttons project inwardly, as can best be seen in Fig. 4.

In the position of Fig. 2, which allows the occupant to sit, the back rest 30 is supported by the two buttons 46, the actual seat 32 by the bottom 24, and the foot rest 34 is hanging downwardly, both the back rest and foot rest extending at angles to the seat 32. In this position, the portion 42' of the stirrup is seated in 50 (see particularly Fig. 5).

In order to convert the stroller into a sleeper, the foot rest 34 is swung upwardly around the pivots 44 whereby at the same time the whole seat moves backward until the free end of the back rest 30 is ready to pass the buttons 46 and the whole seat assumes the dash-dotted line position of Fig. 2. The seat is now moved forward and the portion 42' of the stirrup will be fixed in 52 (Fig. 6) to hold the foot rest horizontally, all three seat sections being finally horizontal, as shown in Fig. 3. During the use of the carriage as a sleeper, the back rest and actual seat rest upon the bottom 24.

To restore the seat to its former position, the portion 42' is fixed at 50, and the foot rest 34 allowed to drop to an inclined position. The entire seat is then moved backward until the back rest is ready to pass the buttons 46 on its return movement. Finally, the entire seat is moved forward to the solid line position of Fig. 2. The studs 53 prevent the seat from sliding backward when the carriage is wheeled forward and up hill. The buttons 48 hold the actual seat 32 in position in either of the two possible seat positions and help guide the seat while it is moved back and forward.

It should be noted that the conversion of the carriage from one position to the other is extremely simple and can be done very quickly.

Reverting to Fig. 1, the handle 54 is of the detachable type. It is shown attached to the solid side walls 12 at the end 14. The dash-dotted line position at the right side of the drawing indicates the possible attachment of the handle at the end 14'.

In the present case, the handle attaching mechanism includes four identical brackets 56 (see Figs. 1, 7 and 8). Two such brackets are fastened to each side wall 12, one bracket at each end. Each bracket comprises a plate 58 which may be screwed to either of the side walls at 60. Secured to each plate 58 is a screw bolt 61, which is engaged by a winged nut 62, and a pin 64.

The handle 54, as can be seen in Fig. 10, consists of a cross bar 66 and two longitudinal bars 68. Riveted to the latter at their free ends are flat extensions 70, each extension being provided with a notch 72 in one side edge and a slot 74 at the end (see Figs. 7 and 9).

The handle is fixed at either end of the carriage by placing the free ends of the extensions 70 within the two brackets 56 at one of the carriage ends. This is done by first taking care that the shanks 76 of the pins 64 be received in the slots 74, and by then turning the handle, the shanks 76 thereby serving as a pivot, until the bolts 61 bear against the roots of the notches 72. In this position the handle is secured in place by tightening the nuts 62.

Referring now to Figs. 11 and 12, the props 20 and 22 are connected to each other by means of a hinged joint 78. Pivotally attached to the prop 20 at 80 is a pawl 82, whereas the prop 22 is provided with a prop handle 84 and a number of uniformly spaced notches 86. While in Fig. 1 the pawl 82 is shown disengaged, in Figs. 11 and 12 it is shown received in one of the notches 86. The pawl 82 and the ratchet portion 88 of the prop 22 form means to releasably lock the top 18 in any position intermediate the open and folded positions. The prop handle 84 is used to actuate the top. There is a pair of such props either on one side or on each side of the top.

In practicing my invention, it will become clear that it offer the advantage of allowing the attendant of the carriage to watch the child while it sleeps and while wheeling the carriage forward, and making it possible to look in the same direction as the child while the carriage is wheeled backward with the child in sitting position. This advantage is ensured by combining the present invention with the detachable handle described hereinbefore and disclosed in my copending application Ser. No. 9071, filed February 18, 1948.

In accordance with another feature of this invention, I use my new adjustable seat simultaneously with the folding top adjustment as likewise described above and disclosed in my copending application Ser. No. 13,300, filed March 5, 1948, which has become abandoned. If a baby carriage provided with my adjustable seat is wheeled backward, it is often desirable to fix the folding top in a position in which it protects the child in the carriage and in which it at the same time allows the attendant to watch the child. The combined used on my carriage of the adjustable seat and the adjustable top adds a very useful feature to the designs of baby carriages.

From the foregoing detailed description, it will be clear that my adjustable seat, its mounting in a carriage, and its manipulation are very simple. The stroller of my invention is inexpensive, but lends every comfort to the occupant both in a sitting and in a lying position.

I claim:

1. Baby carriage comprising a rigid body including a bottom and sides, a seat, and means to adjustably support the seat in positions to allow the occupant of the carriage to sit and lie, respectively, said seat consisting of a back rest, an actual seat and a foot rest, said three seat sections being hingedly connected with each other, said adjustable seat-supporting means including buttons projecting from each of the inner faces of said sides, said bottom, and means for suspending the foot rest from the carriage body, a pair of said buttons on each side jointly supporting the back rest in the sitting position, said bottom slidably supporting said actual seat, the bottom also supporting said back rest in the lying position, said suspending means including a stirruplike member permanently pivoted on said sides and adjustably holding the foot rest in the lying and sitting position, respectively, and a bracket on the foot rest pivotally retaining said stirruplike member in the lying and sitting positions, whereby said two pairs of buttons are cleared when the back rest is moved into the lying position and said bracket retains the stirruplike member during the swinging movement from either of said positions into the other.

2. In the carriage as defined in claim 1, three buttons projecting from each of said inner faces, one of said buttons on each side jointly helping hold the actual seat in position and helping guide the seat when moved from the sitting into the lying position or vice versa.

3. In the carriage as defined in claim 1, the bracket being fastened to the underside of the foot rest, said stirruplike member passing through the bracket.

4. In the carriage as defined in claim 1, the bracket being fastened to the underside of the foot rest, said stirruplike member passing through the bracket, the bracket having two steps to receive the stirruplike member either in said lying or sitting position.

ROBERT S. ARIES.

REFERENCES CITED

The following references are of record in the file of this patent:

UNITED STATES PATENTS

| Number | Name | Date |
|---|---|---|
| D. 150,255 | Reinhold | July 13, 1948 |
| 131,317 | Weed | Sept. 10, 1872 |
| 366,741 | Sands | July 19, 1887 |
| 2,007,804 | Kilimnik | July 9, 1935 |
| 2,384,711 | Troendle | Sept. 11, 1945 |

FOREIGN PATENTS

| Number | Country | Date |
|---|---|---|
| 9,766 | Great Britain | A. D. 1898 |
| 182,981 | Great Britain | July 20, 1922 |
| 204,610 | Great Britain | Oct. 4, 1923 |
| 178,718 | Switzerland | Oct. 16, 1935 |
| 239,662 | Switzerland | Mar. 1, 1946 |
| 243,248 | Switzerland | Jan. 3, 1947 |